United States Patent
Pedersen et al.

(10) Patent No.: US 8,150,443 B2
(45) Date of Patent: Apr. 3, 2012

(54) OVERLOAD INDICATOR FOR ADJUSTING OPEN LOOP POWER CONTROL PARAMETERS

(75) Inventors: Klaus Ingemann Pedersen, Aalborg (DK); Claudio Rosa, Randers (DK); Per Henrik Michaelsen, Aalborg (DK); Carlos Ubeda Castellanos, Elche (ES)

(73) Assignee: Nokia Siemens Networks Oy, Espoo (FI)

( * ) Notice: Subject to any disclaimer, the term of this patent is extended or adjusted under 35 U.S.C. 154(b) by 677 days.

(21) Appl. No.: 12/290,595

(22) Filed: Oct. 30, 2008

(65) Prior Publication Data
US 2009/0111503 A1 Apr. 30, 2009

Related U.S. Application Data

(60) Provisional application No. 61/001,164, filed on Oct. 31, 2007.

(51) Int. Cl.
*H04B 7/005* (2006.01)
(52) U.S. Cl. ........ 455/522; 455/69; 455/67.11; 455/453
(58) Field of Classification Search .................. 455/522, 455/69, 67.11, 68, 67.7, 550.1, 574, 343.2, 455/453, 452.2, 515
See application file for complete search history.

(56) References Cited

U.S. PATENT DOCUMENTS

| | | | | |
|---|---|---|---|---|
| 6,600,773 | B2 * | 7/2003 | Zeira et al. | 375/130 |
| 2006/0160542 | A1 | 7/2006 | Salmenkaita et al. | 455/450 |
| 2008/0161033 | A1 * | 7/2008 | Borran et al. | 455/522 |

OTHER PUBLICATIONS $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP TS 36.300, V8.2.0, Sep. 2007.
Uplink Inter-Cell Power Control: X2 Messages, Motorola, 3GPP TSG RAN1 #50-bis, R1-074042, Oct. 8-12, 2007.
Investigations on Inter-cell Transmission Power Control based on Overload Indicator in E-UTRA Uplink, NTT DoCoMo, 3GPP TSG RAN WG1 Meeting #48bis, Mar. 26-30, 2007, R1-071634.

(Continued)

*Primary Examiner* — John J Lee
(74) *Attorney, Agent, or Firm* — Harrington & Smith

(57) ABSTRACT

The exemplary embodiments of the invention include a method, apparatus, and program to determine actions to be taken upon receiving overload indicators. In one exemplary embodiment of the invention, a method includes: determining if more than a first predetermined number of overload indicator messages are received within a first predetermined period of time. If such a determination is made that more than the first predetermined number of overload indicator messages are received within the first predetermined period of time is made, a value of a power output parameter is adjusted by decreasing the value of the power output parameter, and the adjusted value of the power output parameter is sent. If a determination is made that less than a second predetermined number of overload indicator messages are received within a second predetermined period of time, the value of the power output parameter is adjusted by increasing the value of the power output parameter, sending the adjusted value of the power output parameter is sent.

24 Claims, 4 Drawing Sheets

OTHER PUBLICATIONS

Uplink Scheduling With Inter-Cell Power Control, with Extensions to Interference Coordination, Lucent Technologies, 3GPP TSG-RAN WG1 #47, R1-063478, Nov. 6-10, 2006.

Way Forward on Power Control of PUSCH, CATT, Ericsson, LGE, Motorola, Nokia, Nokia-Siemens, Nortel, NTT DoCoMo, Orange, Panasonic, Philips, Qualcomm, Samsung, Sharp, TI, Vodafone, 3GPP TSG-RAN WG1 #49-bis, R1-073224, Jun. 25-29, 2007.

Uplink Power Control: Details, Motorola, 3GPP TSG RAN1 #49-bis, R1-072675, Jun. 25-29, 2007.

Overload Indicator (OI) Configuration and Reporting Criteria, Nokia Siemens Networks, Nokia, 3GPP TSG RAN WG1 #53 Meeting, R1-081866, May 5-9, 2008.

* cited by examiner

| | |
|---|---|
| IoT THRESHOLD FOR OVERLOAD | 12 dB (APPROACH 1, APPROACH 2)<br>6-8 dB PER INTERFERING UE (APPROACH 3) |
| TRANSMISSION INTERVAL OF OVERLOAD INDICATOR | 1 msec |
| CONTROL DELAY BETWEEN PACKET TRANSMISSION AND REFLECTION TIMING OF OVERLOAD INDICATOR | 4 msec |
| SIGNALING METHOD | ONE-BIT INDICATOR<br>• DOWN/UP RATIO OF Tx POWER = 1 dB<br>• WEIGHTED BY PATH LOSS RATIO FOR APPROACH 2 |
| MAXIMUM Tx POWER REDUCTION BY OVERLOAD INDICATOR | 10 dB |
| DEFINITION OF NON-SERVING CELL RECEIVING OVERLOAD INDICATOR | SINGLE NEIGHBORING CELL WITH THE LOWEST PROPAGATION LOSS AND PROPAGATION LOSS DIFFERENCE WITHIN 6 dB (RESELECTED EVERY 100 msec) |

FIG.2

OVERLOAD INDICATOR FOR ADJUSTING OPEN LOOP POWER CONTROL PARAMETERS

CROSS-REFERENCE TO RELATED APPLICATIONS

This patent application claims priority under 35 U.S.C. §119(e) from U.S. Provisional Patent Application 61/001,164, filed Oct. 31, 2007, the disclosure of which is incorporated by reference herein in its entirety.

TECHNICAL FIELD

The exemplary and non-limiting embodiments of this invention relate generally to wireless communication systems, methods, devices and computer programs and, more specifically, relate to techniques for providing power control at a wireless network node, such as base station or, more specifically, at an evolved Node-B.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| UTRAN | universal terrestrial radio access network |
| Node B | base station |
| UE | user equipment |
| HO | handover |
| E-UTRAN | evolved UTRAN |
| aGW | access gateway |
| eNB | EUTRAN Node B (evolved Node B) |
| MAC | medium access control |
| MM | mobility management |
| PHY | physical |
| RLC | radio link control |
| RRC | radio resource control |
| PDCP | packet data convergence protocol |
| MME | mobility management entity |
| O&M | operations and maintenance |
| LTE | long term evolution |
| FDD | frequency division duplex |
| OFDMA | orthogonal frequency division multiple access |
| SC-FDMA | single carrier, frequency division multiple access |
| UL | uplink |
| DL | downlink |
| OLPC | open loop power control |
| IoT | interference over thermal noise |
| OI | overload indicator |
| TPC | transmission power control |
| Po | power output |

A communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest to this invention is 3GPP TS 36.300, V8.2.0 (2008-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC (Evolved Packet Core), more specifically to a MME (Mobility Management Entity) by means of a S1-MME interface and to a Serving Gateway (S-GW) by means of a S1 interface. The S1 interface supports a many to many relation between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);

IP header compression and encryption of user data stream; selection of a MME at UE attachment;

routing of User Plane data towards Serving Gateway;

scheduling and transmission of paging messages (originated from the MME);

scheduling and transmission of broadcast information (originated from the MME or O&M); and a measurement and measurement reporting configuration for mobility and scheduling.

The OI is currently under discussion in 3GPP RAN WG1 for LTE. The basic concept as presently understood is that the eNB measures the uplink interference over thermal noise (IoT). If the IoT is above a certain threshold, then an event is triggered where an OI message is sent to the eNBs of neighboring cells. The OI may be measured across the entire system bandwidth, or it may be measured for a set of defined sub-bands covering the full system bandwidth, as proposed in R1-074042, R1-071634, and other 3GPP contributions.

Reference in this regard may be made to 3GPP TSG RAN1 #50-bis, R1-074042, Shanghai, China, Oct. 8-12, 2007, "Uplink Inter-cell Power Control: X2 Messages", Motorola; and to 3GPP TSG RAN WG1 Meeting #48bis, R1-071634, St. Julians, Malta, Mar. 26-30, 2007, "Investigations on Inter-cell Transmission Power Control based on Overload Indicator in E-UTRA Uplink", NTT DoCoMo.

More specifically, R1-074042 states that the contents of the X2 message for uplink inter-cell power control should include the following:

quantized IoT level per sub-band (1 or 2 bits);
the load of the cell (1 or 2 bits);
uplink performance satisfaction index (1 or 2 bits); and
other information may be included if proved to be beneficial.

The granularity of the frequency dependent IoT level is said should be configurable and allow the whole bandwidth IoT level be a special case. For example, in case of a relatively large site, the uplink is noise limited and the frequency dependent IoT report might not be necessary.

The X2 messages may be event-driven and sent no faster than every 20 ms. The events may include high/un-acceptable IoT, unsatisfactory uplink performance, and changes of the load in the cell. Due to the X2 delay (20 ms), the measurement (averaging) interval for IoT needs to be of the same order.

With regard to the usage of the overload indicator, R1-074042 states that when the eNode-B receives these X2 messages, it may perform the (inter-cell) power control adaptation schemes in the following ways:

Approach 1: Node-B adapts the parameters of power control formula and then broadcast them to the UEs;

Approach 2: Node-B adjusts the transmission power of individual UEs;

Approach 3: Node-B broadcasts the (processed) X2 messages, the UEs then adapt their transmission power accordingly.

Since the eNode-B has all the information, it is said that it would be natural to adopt Approach 1 or 2 and perform centralized adaptation without additional signaling defined. Approach 3 relies on UEs to adapt their power. After the UE adapts its transmission power, its power headroom needs to be updated to the eNode-B for scheduling or measurement/PA errors correction.

It can be noted that it is further stated that exactly how the eNode-B adapts the parameters of the power control formula, and adjusts the transmission power of UEs, may be specified in order for the inter-operation between eNode-Bs from different vendors.

The above referenced R1-071634 shows in Table 1 (reproduced herein as FIG. 2) various simulation parameters related to inter-cell TPC schemes. The parameters that were used were optimized so that the achievable cell throughput becomes the highest provided without degradation in the 5%-user throughput against the case with only intra-cell TPC. It was assumed that the transmission interval of the overload indicator is 1 msec for all approaches. In Approaches 1 and 2, the threshold of the interference-over-thermal (IoT) is set to 12-15 dB, while in Approach 3 the threshold of IoT per interfering UE is set to 6 dB. If the IoT exceeds the threshold, the overload indicator requests the UEs to decrease the transmission power by 1 dB in Approaches 1 and 3. Otherwise, the transmission power is increased by 1 dB. In Approach 2, according to the algorithm described in 3GPP, R1-063478, Lucent Technologies, "Uplink Scheduling with Inter-Cell Power Control, with Extensions to Interference Coordination", the step size of the transmission power offset is weighted using the path loss difference between the serving cell and non-serving cell. Further, assuming that the control delay in transmission of the overload indicator is 4 ms, the UE only follows the overload indicator, which corresponds to the previous transmission of that UE. In order to avoid excessive power reduction by the overload indicator for the UE near the cell edge, it was assumed that the UE would not lower the transmission power by more than −10 dB of that determined by intra-cell TPC. It was also assumed that all UEs monitor the overload indicator from only a single neighboring cell, which has the lowest propagation loss, i.e., path loss+shadowing+penetration loss. The monitored cell is reselected every 100 ms. However, if the lowest propagation loss value exceeds the propagation loss value of the serving cell by more than 6 dB, no single neighboring cell is monitored and the transmission power is determined using intra-cell TPC.

It should be noted that, as currently considered, the OI is exchanged between eNBs, and there is no direct connection between the OI and a UE in a neighbor cell.

The UL LTE may use the OLPC according to a formula presented in 3GPP TSG-RAN WG1 #49-bis, R1-073224, Orlando, USA, Jun. 25-29, 2007, "Way Forward on Power Control of PUSCH", CATT, Ericsson, LGE, Motorola, Nokia, Nokia-Siemens, Nortel, NTT DoCoMo, Orange, Panasonic, Philips, Qualcomm, Samsung, Sharp, TI, Vodafone.

The power control formula for the PUSCH is outlined as below:

PC formula: $P=\min(P\max, 10\log(M)+P_o+\alpha \times PL+\text{delta\_mcs}+f(\text{delta\_}i))[\text{dBm}]$, where UE obeys the power setting formulation based on the parameters signaled by the network M is the number of assigned RBs (based on UL grant)

Po is a cell specific parameter that is broadcasted (default value)

a is cell specific path loss compensation factor (can be set to one to allow full path loss compensation)

PL is downlink pathloss calculated in the UE delta_mcs is signaled by RRC (table entries can be set to zero)

MCS signaled in UL grant delta_i is UE specific correction value included in the UL grant Function f(*) signaled via higher layers Only two possibilities Accumulated vs. absolute value This should be consistent with interference coordination.

It is known that the setting of the uplink OLPC parameters determines the IoT operation point of the network. For a given path loss compensation factor (also known as Alpha), the setting of the OLPC parameter Po has a high impact on the obtained IoT. However, the mapping from Po to the actually experienced IoT depends strongly on, for example, the path-loss distribution and the cell topology. As a result, in practice it is non-trivial to set the Po parameter corresponding to the desired IoT operation point.

What is currently not resolved is exactly what action(s) that the eNB should take as a function of the OI, and exactly how the eNB should use the OI information.

SUMMARY

The foregoing and other problems are overcome, and other advantages are realized, by the use of the exemplary embodiments of this invention.

In a first aspect thereof the exemplary embodiments of this invention provide a method comprising: determining if more than a first predetermined number of overload indicator messages are received within a first predetermined period of time; in response to a determination that more than the first predetermined number of overload indicator messages are received within the first predetermined period of time, adjusting a value of a power output parameter by decreasing the value of the power output parameter, and sending the adjusted value of the power output parameter. In response to a determination that less than at least one second predetermined number of overload indicator messages are received within at least one second predetermined period of time, the value of the power output parameter is adjusted by increasing the value of the power output parameter, and the adjusted value of the power output parameter is thereafter sent.

In accordance with another exemplary embodiment of the invention, an apparatus comprises a processor and a transceiver configured to: determine if more than a first predetermined number of overload indicator messages are received within a first predetermined period of time; in response to a determination that more than the first predetermined number of overload indicator messages are received within the first predetermined period of time, adjust a value of a power output parameter by decreasing the value of the power output parameter, and send the adjusted value of the power output parameter. In response to a determination that less than at least one second predetermined number of overload indicator messages are received within at least one second predetermined period of time, the value of the power output parameter is adjusted by increasing the value of the power output parameter, and the adjusted value of the power output parameter is thereafter sent.

In accordance with still another exemplary embodiment of the invention, there is a program storage device readable by an apparatus, tangibly embodying a program of instructions executable by the apparatus for performing operations comprising: determining if more than a first predetermined number of overload indicator messages are received within a first predetermined period of time; in response to a determination that more than the first predetermined number of overload indicator messages are received within the first predetermined period of time, adjusting a value of a power output parameter by decreasing the value of the power output parameter, and sending the adjusted value of the power output parameter. In response to a determination that less than at least one second predetermined number of overload indicator messages are received within at least one second predetermined period of time, the value of the power output parameter is adjusted by increasing the value of the power output parameter, and the adjusted value of the power output parameter is thereafter sent.

BRIEF DESCRIPTION OF THE DRAWINGS

In the attached Drawing Figures:

FIG. 2 reproduces Table 1 of R1-071634.

DETAILED DESCRIPTION

The exemplary embodiments of this invention relate in general to UTRAN LTE, and more specifically provide an eNB apparatus, method and algorithm to adjust one of the uplink OLPC parameters based on received OI information from neighboring cells. By using the algorithm a network operator may avoid detailed network planning for setting the considered OLPC parameter.

It is initially pointed out that while one may assume, based on various ones of the publications cited above, that the OI is based on an IoT measurement, it is within the scope of the exemplary embodiments of this invention to base the OI on a physical layer measurement of the average UL received interference plus thermal noise per PRB, where there is a three level representation of the OI expressing low, medium, and high interference plus thermal noise per PRB. The average UL received interference is compared against two thresholds defined per PRB to determine whether it is low, medium, or high.

Figure 3:
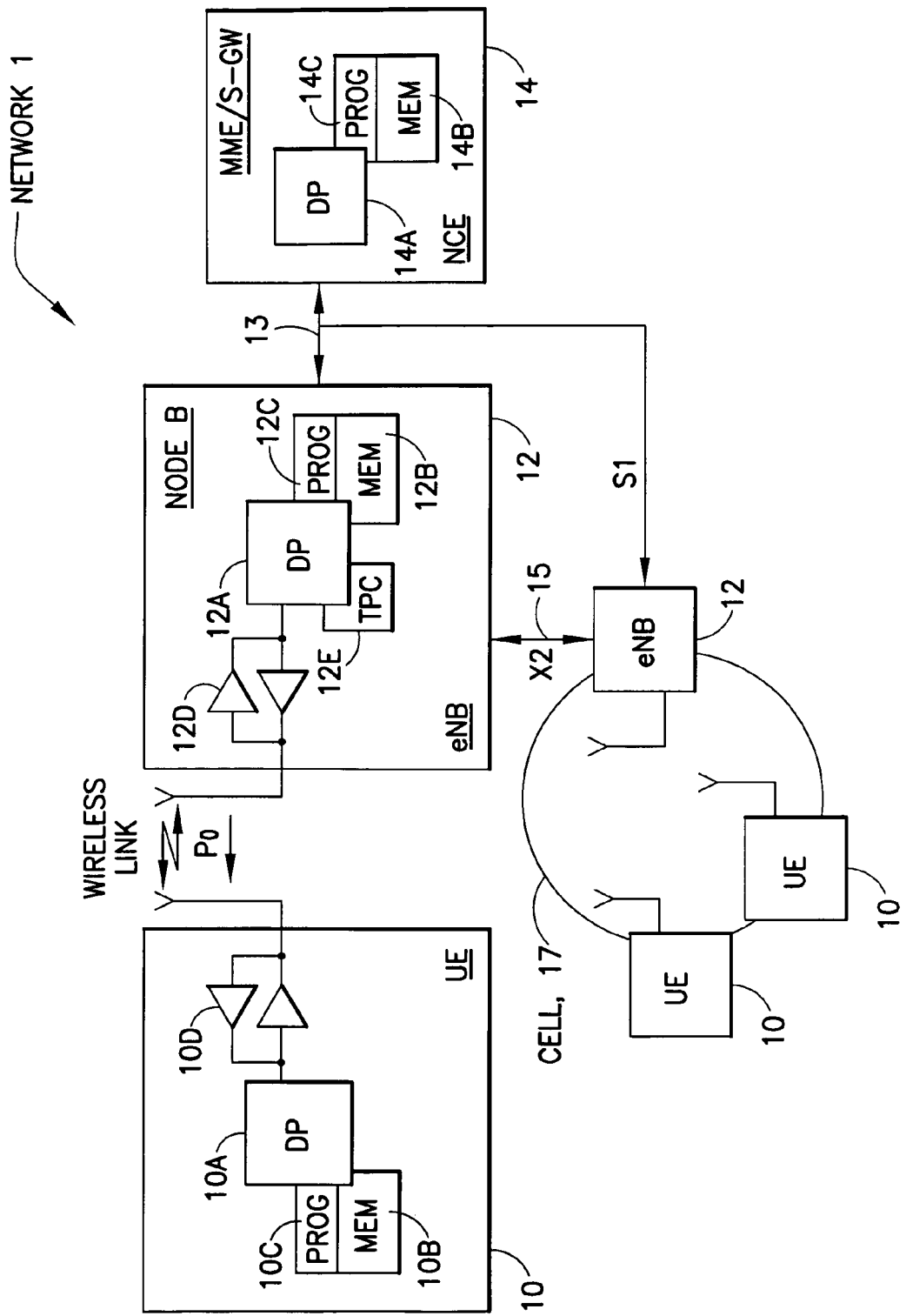
FIG. 3 shows a simplified block diagram of various electronic devices that are suitable for use in practicing the exemplary embodiments of this invention.

Reference is made to FIG. 3 for illustrating a simplified block diagram of various electronic devices that are suitable for use in practicing the exemplary embodiments of this invention. In FIG. 3 a wireless network 1 (which may be an EUTRAN network) provides communication with a UE 10 via a Node B (base station) 12. The network 1 may include a network control element (NCE) 14, such as the MME/S-GW shown in FIG. 1. The UE 10 includes a control such as a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 (S1 interface) to the NCE 14 that also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

Figure 1:
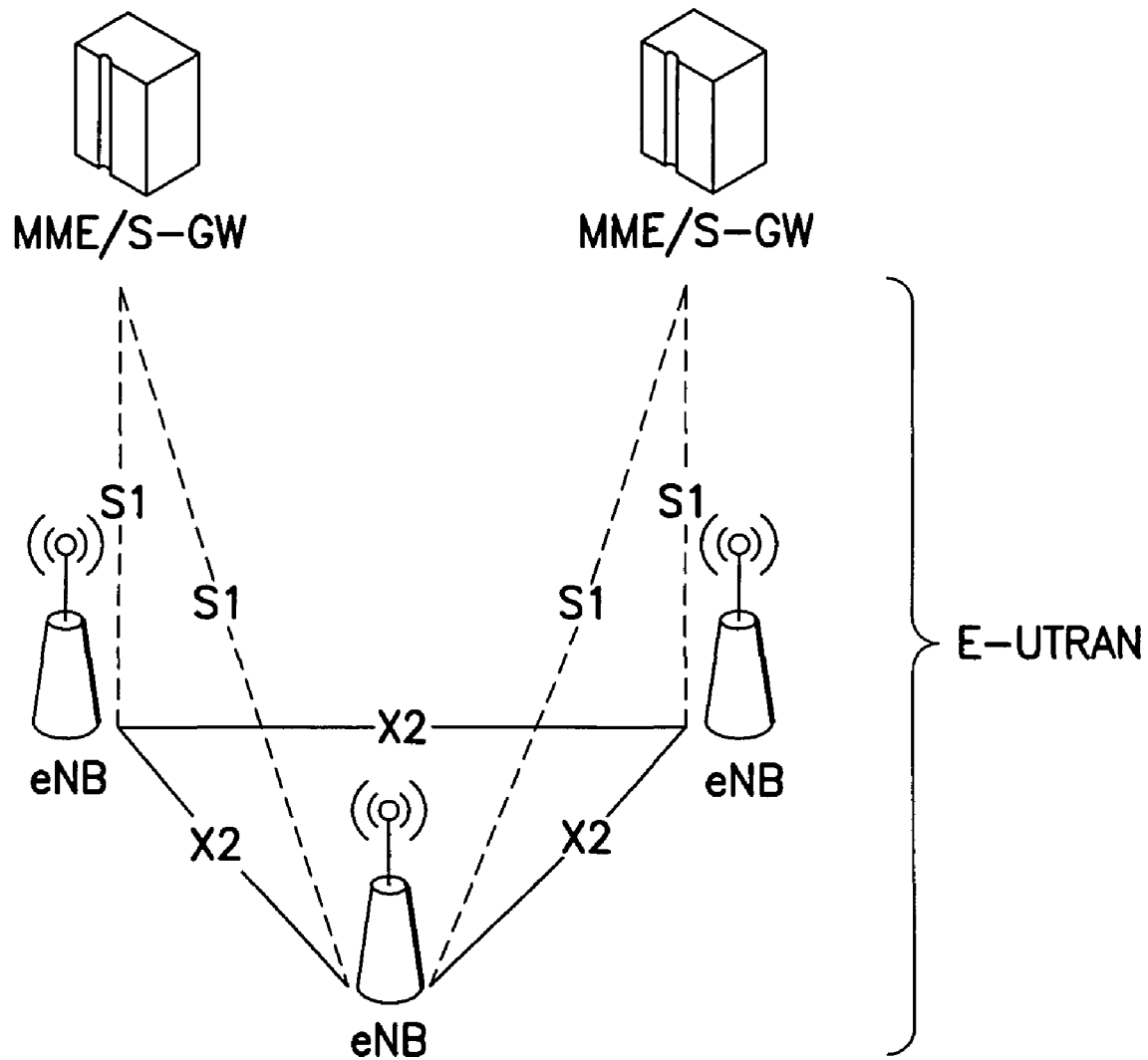
FIG. 1 reproduces FIG. 4 of 3GPP TS 36.300, and shows the overall architecture of the E-UTRAN system.

Also shown is a second eNB 12 (in practice there may be many eNBs deployed within a certain geographical area), that is coupled with the first eNB 12 via an interface 15 (the X2 interface shown in FIG. 1). Each eNB 12 may be assumed to support a cell 17 within which any number of UEs 10 may be currently located.

For the purposes of describing the invention the eNBs 12 are assumed to include a TPC unit or function 12E that operates in accordance with the exemplary embodiments. The TPC 12E may be implemented in hardware, in software (including firmware), or in a combination of hardware and software. For the purposes of describing this invention it is also assumed that the eNBs 12 send the OI over the X2 interface.

In general, the exemplary embodiments of this invention may be implemented at least in part by computer software executable by the DP 10A of the UE 10 and by the DP 12A of the Node B 12, or by hardware, or by a combination of software and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention provide a technique to exploit the OI information at the eNB 12, and assume that the network 1 is planned for a certain maximum uplink IoT. Assuming a maximum IoT, it is possible for the network operator to dimension the maximum allowed path loss (link budget) to obtain a certain uplink data rate for UEs 10 located at the cell edge. It is furthermore assumed that the threshold used for triggering OI reporting is set equal to the planned maximum IoT value.

As is noted in 3GPP TSG RAN1 #49-bis, R1-072675, Orlando, USA, Jun. 25-29, 2007, "Uplink Power Control: Details", Motorola, with regard to uplink inter-cell power control the contents of the X2 message for uplink inter-cell power control may include the following: quantized IoT level (1 or 2 bits), UL performance satisfaction (1 or 2 bits), and other information may be included if proved to be beneficial. The X2 messages may be event-driven and sent no faster than every 20 ms. These events may include high/un-acceptable IoT and unsatisfactory uplink performance. When the eNB receives these X2 messages, it may perform the (inter-cell) power control adaptation schemes in the following ways:

Approach 1: eNB adapts the parameters of power formula
Approach 2: eNB adjusts the transmission power of individual UEs
Approach 3: eNB broadcasts the (processed) X2 messages, and the UEs then adapt their transmission power accordingly.

The exemplary embodiments of this invention provide, in one aspect thereof, an adaptive eNB 12 algorithm for automatically adjusting the Po parameter to operate at a desired IoT level.

This adaptive algorithm for enabling the TPC function 12E of the eNB 12 to adjust Po may be expressed as follows (reference is also made to FIG. 4).

At Step 4A a determination is made if more than N OI messages are received within a time-window of T1 seconds, and if so, at Step 4B decrease Po with P_down decibels. Control then passes to Step 4E to send the current value of Po to the UE(s) 10.

At Step 4C a determination is made if less than M OI messages are received within a time-window of T2 seconds, and if so, at Step 4D increase Po with P_up decibels. Control then passes to Step 4E to send the current value of Po to the UE(s) 10.

The variables; N, M, T1, T2, P_down, and P_up are configuration parameters, where parameters N and M are positive integers, T1 and T2 may be measured in milliseconds, and P_down and P_up are in units of decibels. If the eNB 12 determines to adjust the Po parameter according to one of the two above listed criteria in Steps 4A and 4B, a new Po value is send to the UEs 10 in the cell supported by the eNB 12.

Note that it is within the scope of these exemplary embodiments to include an additional parameter, such that the eNB 12, at most, signals a new Po value to the UEs 10 every T3 seconds. This may be useful for controlling the maximum rate of messages with new Po values that are sent over the air interface, and thus reduces the amount of DL signaling.

Figure 4:
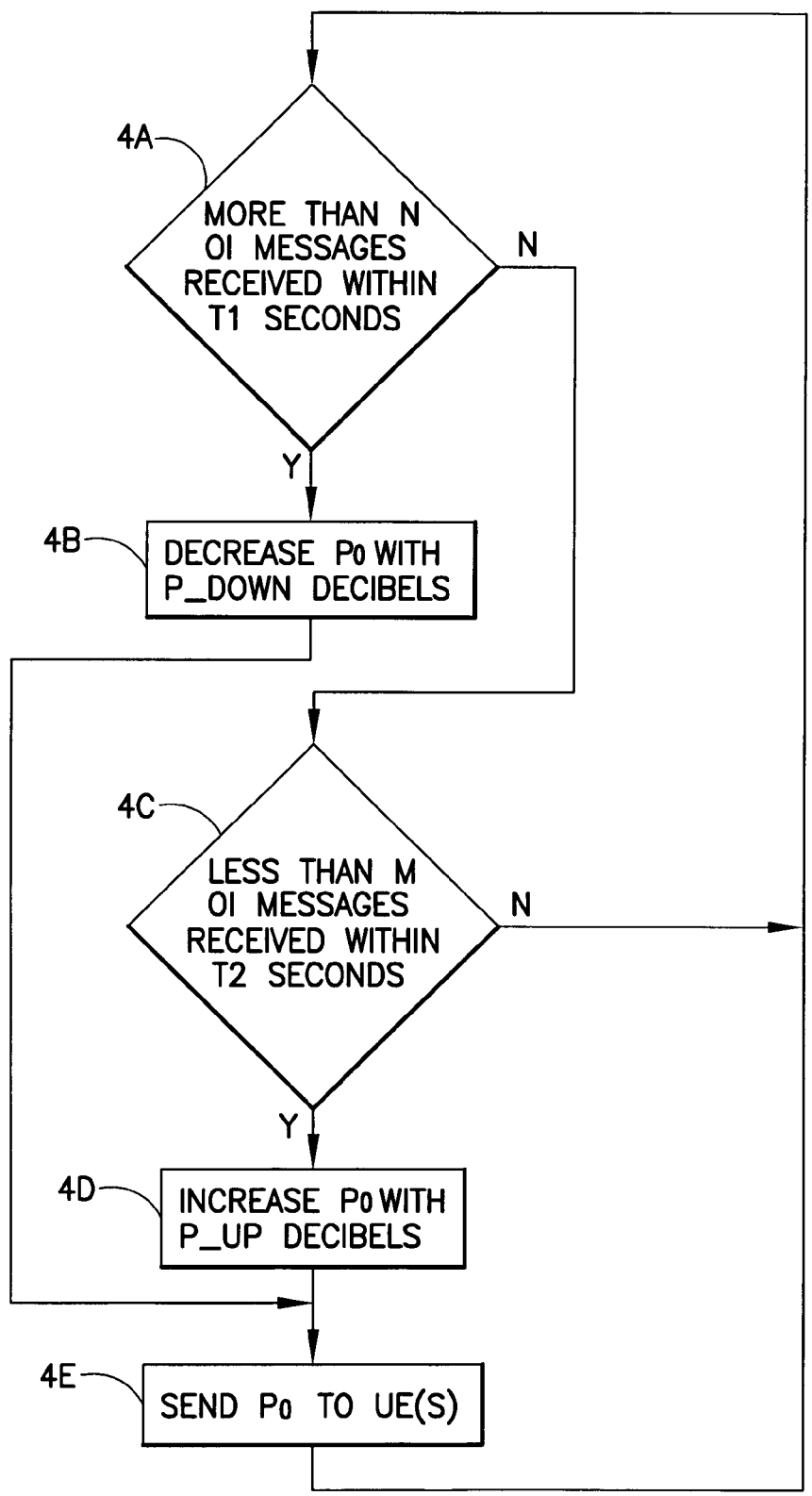
FIG. 4 is a logic flow diagram that illustrates the operation of a method, and a result of execution of computer program instructions embodied on a computer readable memory, in accordance with the exemplary embodiments of this invention.

If the OI is measured per sub-band, then the algorithm operates as in FIG. 4 independently for each sub-band, and the Po values in this case need be are sent only to those UEs 10 being scheduled in those sub-bands (e.g., by means of UE-specific Po settings via RRC signaling).

As one non-limiting example, by setting T1=T2 and N=M+1, the ratio between P_down/P_up determines the portion of time where the network 1 operates above/below the desired IoT target used for triggering the OI message (i.e., the IoT threshold used for triggering the generation and sending of OI to other eNBs 12 over the X2 interface).

The algorithm disclosed above may be enhanced by the eNB 12 differentiating between OIs received from different neighboring cells. For example, the OI may be weighted based on information in a Background Interference Matrix (BIM), if such a matrix is available. This approach may be particularly helpful in cases with strong interference coupling between specific cells/sectors. Reference with regard to a BIM may be had to, for example, US Patent Application Publication US 2006/0160542 A1, Method and System for Allocating Channels in a Cellular Communication Network, Matti Salmenkaita et al., Nokia Corporation.

As the algorithm depicted in FIG. 4 for adjusting Po is recursive, it is preferred to provide an initial value for Po. Further, it may be preferred to include a minimum and a maximum limit for the value of Po, thereby allowing the algorithm to adjust Po only within some certain, predetermined dynamic range.

It should be noted that the various blocks shown in FIG. 4 may be viewed as method steps, and/or as operations that result from operation of computer program code, and/or as a plurality of coupled logic circuit elements constructed to carry out the associated function(s).

Based on the foregoing it should be apparent that the exemplary embodiments of this invention provide a method, apparatus and computer program product(s) to set the OLPC parameter Po in an automatic fashion at the eNB 12, enabling the network 1 to operate around a desired IoT level.

In accordance with an exemplary embodiment of a method the eNB determines, in a recursive manner, if more than N OI messages are received within a time-window of T1 seconds, and if so, the eNB decreases a value of Po by P_down decibels, and sends the adjusted value of Po to at least one UE; and further determines if less than M OI messages are received within a time-window of T2 seconds, and if so, the eNB increases Po by P_up decibels, and sends the adjusted value of Po to the at least one UE.

In the method of the preceding paragraph, where variables; N, M, T1, T2, P_down, and P_up are configuration parameters, where parameters N and M are positive integers, T1 and T2 may be measured in milliseconds, and P_down and P_up are in units of decibels.

In the method of the preceding paragraphs, where the eNB sends a new Po value to the at least one UE every T3 seconds for controlling the maximum rate of messages with new Po values that are sent over the air interface.

In the method of the preceding paragraphs, where the OI is measured per sub-band, where the method operates independently for each sub-band, and where the adjusted Po value is sent only to a UE being scheduled in a specific sub-band.

In the method of the preceding paragraphs, where T1=T2 and N=M+1, and the ratio between P_down/P_up determines a portion of time where a wireless network operates above or below a desired IoT target used for triggering the sending of OI messages.

In the method of the preceding paragraphs, where the eNB differentiates between OIs received from different neighboring cells.

Further in accordance with an exemplary embodiment of an apparatus, an eNB comprises a TPC functional block (and power control means) configurable to determine, in a recursive manner, if more than N OI messages are received within a time-window of T1 seconds, and if so, to decrease a value of Po by P_down decibels, and to transmit the adjusted value of Po to at least one UE; and to further determine if less than M OI messages are received within a time-window of T2 seconds, and if so, to increase Po by P_up decibels, and to transmit the adjusted value of Po to the at least one UE.

The apparatus of the preceding paragraph, where variables; N, M, T1, T2, P_down, and P_up are configuration parameters, where parameters N and M are positive integers, T1 and T2 may be measured in milliseconds, and P_down and P_up are in units of decibels.

The apparatus of the preceding paragraphs, where the eNB transmits a new Po value to the at least one UE every T3 seconds for controlling a maximum rate of messages with new Po values that are sent over the air interface.

The apparatus of the preceding paragraphs, where the OI is measured per sub-band, where the apparatus operates independently for each sub-band, and where the adjusted Po value is transmitted only to a UE being scheduled in a specific sub-band.

The apparatus of the preceding paragraphs, where T1=T2 and N=M+1, and the ratio between P_down/P_up determines a portion of time where a wireless network operates above or below a desired IoT target used for triggering the sending of OI messages.

The apparatus of the preceding paragraphs, where the apparatus differentiates between OIs received from different neighboring cells.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g. N, T1, OI, Po, etc.) are not intended to be limiting in any respect, as these parameters may be identified by any suitable names. Further, the formulas and expressions that use these various parameters may differ from those expressly disclosed herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   determining if more than a first predetermined number of overload indicator messages are received within a first predetermined period of time;
   in response to a determination that more than the first predetermined number of overload indicator messages are received within the first predetermined period of time, adjusting a value of a power output parameter by decreasing the value of the power output parameter, and sending the adjusted value of the power output parameter; and
   in response to a determination that less than at least one second predetermined number of overload indicator messages are received within at least one second predetermined period of time, adjusting the value of the power output parameter by increasing the value of the power output parameter, and sending the adjusted value of the power output parameter.

2. The method according to claim 1, wherein the determination of the number of overload indicator messages occurs in a recursive manner.

3. The method according to claim 1, further comprising setting the power output parameter to enable a network to operate around a desired interference over thermal noise level.

4. The method according to claim 1, where variables N, M, T1, T2, P_down, and P_up are configuration parameters, where N and M are positive integers that indicate the first and at least one second predetermined number of overload indicator messages respectively, T1 and T2 are the first and at least one second predetermined periods of time, respectively, within which the overload indicator messages are received and may be measured in milliseconds, and where P_down and P_up indicate an amount in decibels by which the power output parameter is increased or decreased, respectively.

5. The method according to claim 4 where T1=T2 and N=M+1, and the ratio of P_down to P_up determines a portion of time where a wireless network operates above or below a desired interference over thermal noise target used for triggering the sending of overload indicator messages.

6. The method according to claim 1 further comprising: sending a new power output value every T3 seconds for controlling a maximum rate of messages with new power output values sent over an air interface.

7. The method according to claim 1 where overload indicators are measured per frequency sub-band, where the method operates independently for each sub-band, and where the adjusted power output value is sent to a user equipment scheduled in a specific sub-band.

8. The method according to claim 1 further comprising differentiating between the overload indicators received from neighboring cells, where the overload indicators are weighted.

9. An apparatus comprising a processor and a transceiver configured to: determine if more than a first predetermined number of overload indicator messages are received within a first predetermined period of time;

in response to a determination that more than the first predetermined number of overload indicator messages are received within the first predetermined period of time, adjust a value of a power output parameter by decreasing the value of the power output parameter, and send the adjusted value of the power output parameter; and in response to a determination that less than at least one second predetermined number of overload indicator messages are received within at least one second predetermined period of time, adjust the value of the power output parameter by increasing the value of the power output parameter, and send the adjusted value of the power output parameter.

10. The apparatus according to claim 9, configured to determine the number of overload indicator messages in a recursive manner.

11. The apparatus according to claim 9, further configured to set the power output parameter in an automatic fashion to enable a network to operate around a desired interference over thermal noise level.

12. The apparatus according to claim 9, where variables N, M, T1, T2, P_down, and P_up are configured where N and M are positive integers that indicate the first and at least one second predetermined number of overload indicator messages respectively, T1 and T2 are the first and at least one second predetermined periods of time, respectively, within which the overload indicator messages are received and may be measured in milliseconds, and where P_down and P_up indicate an amount in decibels by which the power output is decreased or increased, respectively.

13. The apparatus according to claim 12, where the configuration comprises T1=T2 and N=M+1, and the ratio of P_down to P_up determines a portion of time where a wireless network operates above or below a desired interference over thermal noise target used for triggering the sending of overload indicator messages.

14. The apparatus according to claim 9, further configured to send a new power output value every T3 seconds for controlling a maximum rate of messages with new power output values sent over an air interface.

15. The apparatus according to claim 9, further configured to measure overload indicators per frequency sub-band where the method operates independently for each sub-band, and the adjusted power output value is sent to a user equipment scheduled in a specific sub-band.

16. The apparatus according to claim 9, where the configuration comprises differentiating the overload indicators received where the overload indicators are weighted.

17. A tangible, non-transitory program storage device readable by an apparatus, tangibly embodying a program of instructions executable by the apparatus for performing operations, said operations comprising:

determining if more than a first predetermined number of overload indicator messages are received within a first predetermined period of time;

in response to a determination that more than the first predetermined number of overload indicator messages are received within the first predetermined period of time, adjusting a value of a power output parameter by decreasing the value of the power output parameter, and sending the adjusted value of the power output parameter; and in response to a determination that less than at least one second predetermined number of overload indicator messages are received within at least one second predetermined period of time, adjusting the value of the power output parameter by increasing the value of the power output parameter, and sending the adjusted value of the power output parameter.

18. The tangible, non-transitory program storage device as in claim 17, wherein the determination of the number of overload indicator messages occurs in a recursive manner.

19. The tangible, non-transitory program storage device as in claim 17, further comprising setting the power output parameter to enable a network to operate around a desired interference over thermal noise level.

20. The tangible, non-transitory program storage device as in claim 17, where variables N, M, T1, T2, P_down, and P_up are configuration parameters where N and M are positive integers that indicate the first and at least one second predetermined number of overload indicator messages respectively, T1 and T2 are the first and at least one second predetermined periods of time, respectively, within which the overload indicator messages are received and may be measured in milliseconds, and where P_down and P_up indicate an amount in decibels by which the power output parameter is decreased or increased, respectively.

21. The tangible, non-transitory program storage device as in claim 20, where T1=T2 and N=M+1, and the ratio of P_down to P_up determines a portion of time where a wireless network operates above or below a desired interference over thermal noise target used for triggering the sending of overload indicator messages.

22. The tangible, non-transitory program storage device as in claim 17, further comprising: sending a new power output value every T3 seconds for controlling a maximum rate of messages with new power output values sent over an air interface.

23. The tangible, non-transitory program storage device as in claim 17, where overload indicators are measured per frequency sub-band, where the method operates independently for each sub-band, and where the adjusted power output value is sent to a user equipment scheduled in a specific sub-band.

24. The tangible, non-transitory program storage device as in claim 17, further comprising differentiating between the overload indicators received from neighboring cells, where the overload indicators are weighted.

\* \* \* \* \*